United States Patent [19]

Papiernik et al.

[11] Patent Number: 4,950,090

[45] Date of Patent: Aug. 21, 1990

[54] METHOD FOR THE DETECTION AND REGULATION OF A SPRING MOMENT AND A DIFFERENCE SPEED IN ROTATIONALLY DRIVEN TWO-MASS SYSTEMS

[75] Inventors: Wolfgang Papiernik, Erlangen; Hans-Peter Troendle, Forchheim/Kersbach, both of Fed. Rep. of Germany

[73] Assignee: Siemens Aktiengesellschaft, Berlin & Munich, Fed. Rep. of Germany

[21] Appl. No.: 260,378

[22] Filed: Oct. 20, 1988

[30] Foreign Application Priority Data

Oct. 26, 1987 [DE] Fed. Rep. of Germany ....... 3736214

[51] Int. Cl.$^5$ .............................................. H02P 5/00
[52] U.S. Cl. ..................................... 388/815; 388/902
[58] Field of Search ................................ 318/306–311, 318/609–610; 388/800, 809–811, 812–815, 833, 902, 904, 911, 930

[56] References Cited

PUBLICATIONS

Regelungstechnik, vol. 26, No. 11; Nov. 1978, pp. 349–380.

*Primary Examiner*—William M. Shoop, Jr.
*Assistant Examiner*—David Martin
*Attorney, Agent, or Firm*—Kenyon & Kenyon

[57] ABSTRACT

A method for the detection and regulation of a spring moment and a difference speed in rotationally driven systems in which a drive unit can be viewed as an elastically coupled two-mass system. The spring moment and the difference speed are determined without direct measurement of the actual load speed or the load position. This is done by comparison of the actual motor speed influenced by the spring moment and a simulated actual motor speed. The resulting difference speed and spring moment are directly proportional to the actual difference speed and the actual spring moment and can be supplied to the regulating system of the motor for regulating the intrinsic oscillations of the system.

3 Claims, 2 Drawing Sheets

METHOD FOR THE DETECTION AND REGULATION OF A SPRING MOMENT AND A DIFFERENCE SPEED IN ROTATIONALLY DRIVEN TWO-MASS SYSTEMS

FIELD OF THE INVENTION

The present invention relates to a method for detecting and regulating a spring moment and a difference speed in rotationally driven systems, where the entire drive unit functions like an elastically coupled two-mass system.

BACKGROUND OF THE INVENTION

Shafts or axles of rotationally driven systems are subjected to torsional tensions which lead to elastic deformations due to the non-ideal rigid material properties of the shaft or axle. From a physics viewpoint, the drive unit can be conceptualized as two ideal, rigid masses which are connected by a spring. One mass is the inert mass of the motor, while the other mass is the inert mass of the load. A drive unit such as this has intrinsic oscillations which adversely affect the regulation of a particular system, for example a machine tool or a robot. The oscillations also strongly stress the affected material.

In systems in which the particular load is moved either rotationally or linearly, such as commercially available machine tools, it is possible to measure a difference speed or a difference position between the load shaft and the motor shaft. This could be done by one sensor on the motor and another sensor on the load. Sensors are always present on the motor shaft in regulated systems. For the regulation of a spring moment or a difference speed, additional sensors on the load shaft are required. This measure, however, is very expensive.

It is often impossible to attach a direct measuring system on the load. An example of this is robots which are able to move their hand or their gripper to any given point of a predetermined three-dimensional working space.

The problem posed is to provide a method for regulating a spring moment and a difference speed so that the occurring spring moment and the difference speed are determinable without directly measuring the speed of a load shaft or the load position.

SUMMARY OF THE INVENTION

The above and other problems are solved by the present invention by providing a method for detecting and regulating a spring moment and a different speed in a rotationally driven system having a motor and a load in a drive unit which acts like an elastically coupled two-mass system. The method comprises the steps of simulating in a control unit, a spring moment and a difference speed between a first mass and a second mass of the drive unit. The first mass represents the inert mass of the motor while the second mass represents the inert mass of the load. The simulated spring moment and simulated different speed are supplied as correction values to a system regulator that regulates the rotationally driven system. The simulating step includes the steps of determining the simulated difference speed as the difference between a simulated motor speed and actual motor speed, and integrating the simulated difference speed to form the simulated spring moment.

An embodiment of the present invention further comprises the steps of setting a nominal motor moment from which setting and at least one of the correction values the actual motor speed is derived with a PI controller. An occurring load moment is compensated for by the I-component of the PI controller. By this step, in addition to the regulation of the spring moment, a potentially occurring load moment can be compensated.

The entire regulating system in another embodiment presets the nominal motor moment by using a proportional element and the correction value. An occurring load moment is compensable by integration of a derived speed difference. This derived speed difference is determined from a comparison of a theoretical motor speed which has been generated by simulating the driven system and the control unit, and comparing this theoretical motor speed and the actual motor speed to produce the derived speed difference. This method of regulating the load moment is particularly advantageous if a higher regulating velocity is to be achieved, since through this measure the time response of the regulating system is improved approximately by a factor of two compared to a PI controller.

DETAILED DESCRIPTION OF THE DRAWINGS

Figure 1:
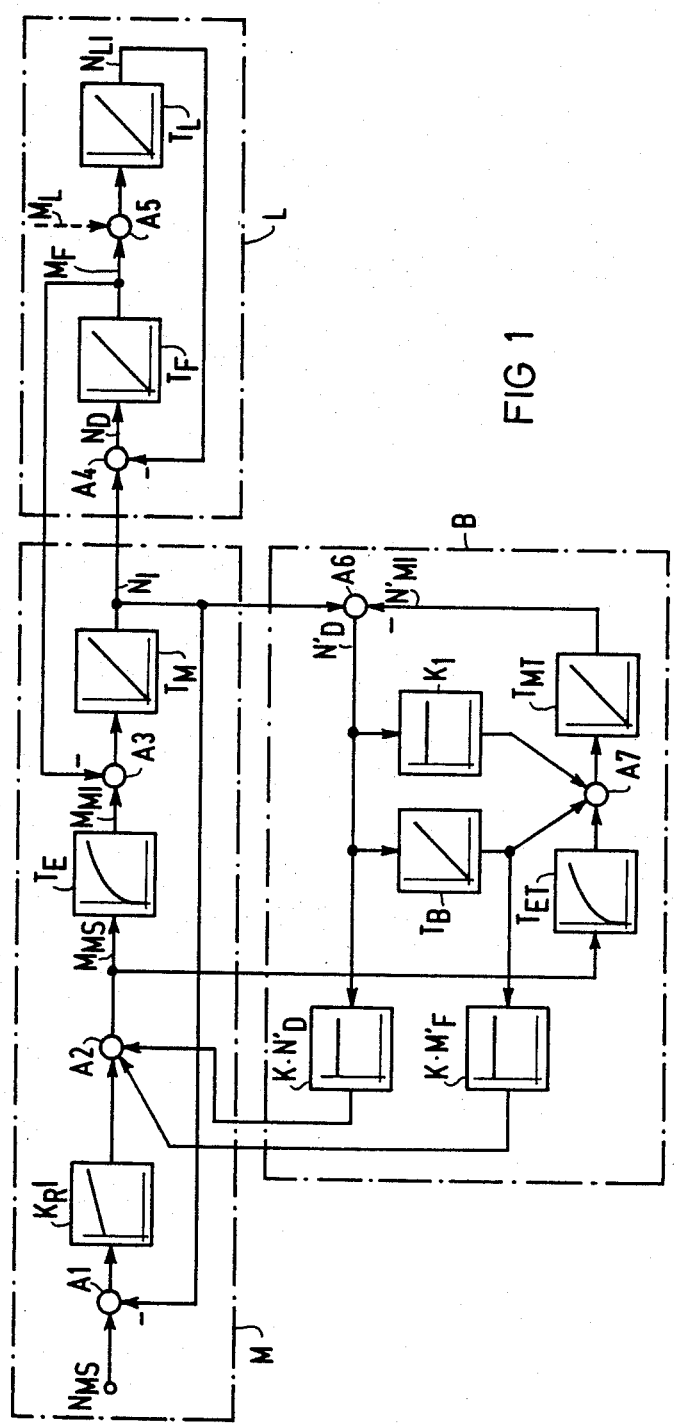
FIG. 1 shows a signal flow chart of a regulating system according to the present invention having a PI controller for compensating the load moment.
Figure 2:
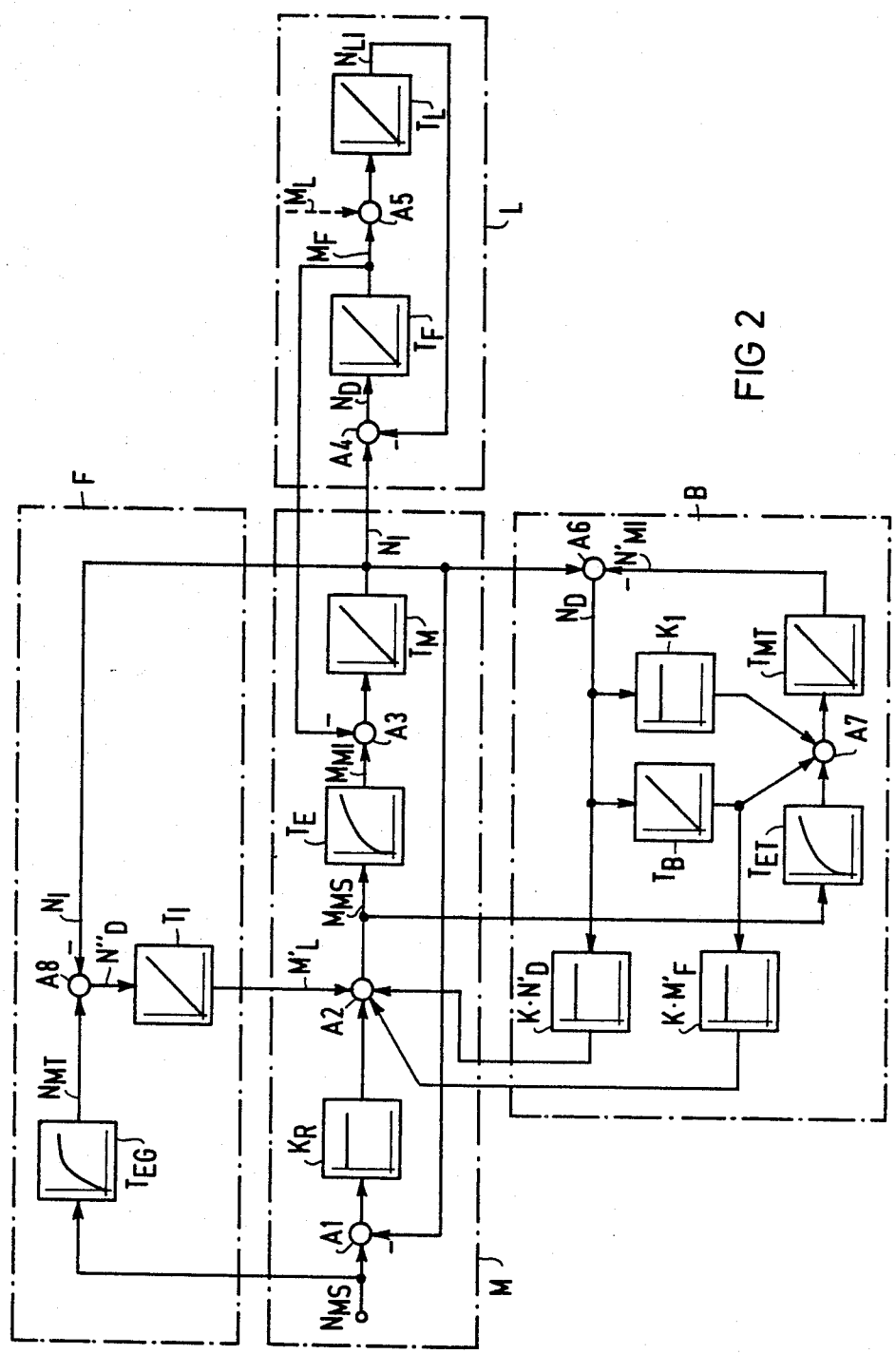
FIG. 2 shows a signal flow chart of a regulating system according to the present invention having a system simulation for compensating the load moment.

In the signal flow charts according to FIGS. 1 and 2, the direction of the particular signal flow is indicated by arrows. The functional relationship between a particular output signal and an input signal for each block of the signal flow chart is identified by the particular transfer function drawn in the respective block. In addition, the particular blocks are denoted with their characteristic constants or time constants. These constants or time constants are also used in the following description as reference numerals.

FIG. 1 shows a signal flow chart of a regulating system according to the invention with a PI controller $K_RI$ for compensating a load moment. The signal flow chart is divided by dashed lines respectively into the regulator circuit M of a motor shaft which corresponds to the mechanical implementation model of the inner mass of the motor and the regulator circuit L of a load shaft which corresponds to the mechanical implementation model of the inner mass of the load, as well as into the regulator circuit B of a control unit.

The motor shaft and load shaft comprises in the simplest case, a machine tool, for example, an axle which is driven by a motor. The axle is acted upon by a load in the form of a milling head, for example. Corresponding mechanical implementations are given by the particular system for which regulation is sought (machine tool, robot, etc.). Therefore, a specific example of a system to be regulated has been omitted.

A drive shaft in the system represents a drive unit which conceptually can be divided into two separate masses, the motor shaft and the load shaft, with both masses being ideally connected by a spring. The inert mass of the motor shaft and the inert mass of the load shaft are considered to be ideally rigid. The spring connecting the two masses represents the elasticity of the real, not ideally rigid shaft.

If the regulator circuit M of the motor shaft is supplied at its input with a nominal speed $N_{MS}$, then the motor is supplied with a nominal motor moment $M_{MS}$ via regulator $K_R*I$. The nominal motor moment $M_{MS}$ is regulated by the regulator element $T_E$ according to the motor characteristics. This regulator element provides an actual motor moment $M_{MI}$ which leads to a rotational motion of the motor. Due to the elasticity of the drive shaft the actual motor moment $M_{MI}$ is opposed by the spring moment $M_F$ as shown at the adder element A3. At the output of an integration element $T_M$ an actual speed $N_I$ of the motor shaft corresponding to the resulting drive moment is tapped off. This actual speed $N_I$ of the motor shaft is, however, not identical with the actual speed of the load shaft $N_{LI}$. Still using the model of two rigid masses and a connecting spring, during start-up of the motor the spring first tightens and only then does the load shaft L rotate, delayed in both time and position.

The regulator circuit L of the load shaft is a physical model which corresponds to the second mass of the two-mass system model. Assuming that the actual speed for the load shaft $N_{LI}$ could be measured, this actual load shaft speed $N_{LI}$ could be subtracted at the adder A4 from the actual speed of motor $N_I$. An integral relationship exists between the resulting difference speed $N_D$ and the spring moment $M_F$ so that the spring moment $M_F$ is determinable via the integration element $T_F$. However, it is precisely this measurement of the actual speed $N_{LI}$ of the load shaft that the present invention avoids.

In the regulator circuit B of the control unit, the motor characteristic is simulated by a regulator element $T_{ET}$ so that the actual speed of motor $N_I$ is simulated through the integrating element $T_{MT}$. The actual speed $N_I$, which can be picked off by the sensor of the motor, can be compared with the simulated actual speed $N'_{MI}$ at adder A6.

When a spring moment $M_F$ is present at adder A3 of the regulator circuit M of the motor shaft, a regulating difference $N'_D$ is obtained at adder A6. This regulating difference $N'_D$ is the difference between the actual speed $N_I$ as influenced by the spring moment $M_F$ of the motor and the simulated actual speed $N'_{MI}$ that is not yet influenced by the spring moment $M_F$.

The PI regulator, comprising an integrator $T_B$ and a proportional element $K_1$, acts via adder A7 upon the regulating systems for simulation of the motor speed $N'_{MI}$. The PI regulator acts until the regulating difference $N'_D$ at adder A6 becomes zero.

When the regulating difference $N'_D$ at adder A6 is equal to zero in the steady state, the quantity sent by the integrating element $T_B$ to the adder A7 corresponds exactly to the quantity $M'_F$. In the regulator circuit M of the motor shaft, the quantity $M'_F$ acts at adder A3, and therefore corresponds to the spring moment $M_F$.

If the substitute time constant of regulator circuit B of the control unit is made significantly smaller than the period of oscillation of the spring-mass system, then the spring moment $M'_F$ appears dynamically at the output of the integrating element $T_B$. The spring moment $M'_F$ is smoothed with the substitute time constant of the regulator circuit B of the control unit.

As evident in the regulator circuit L of the load shift, the spring moment $M_F$ is the result of integration of the difference speed $N_D$ between the inert mass of the motor and the inert mass of the load.

The spring moment $M'_F$ also results from an integration (by the integrating element $T_B$ in the regulator circuit B). Therefore, the input signal of the integrating element $T_B$, and thus the regulating deviation $N'_D$ which is formed at adder A6, is directly proportional to the difference speed $N_D$.

The difference speed $N'_D$ determined by the control unit B as well as the spring moment $M'_F$ are then each multiplied by a constant factor K. The products are supplied through adder A2 to the regulator circuit M of the motor shaft so that the intrinsic oscillation of the spring-mass system can thereby be regulated.

If in addition to the spring moment $M_F$ a load moment $M_L$ is effective, as shown in the regulator circuit L of the load shaft by a dashed effect line leading to adder A5, then this load moment $M_L$ can be compensated for by the I-component of the PI controller $K_R*I$ in the regulator circuit of the motor shaft M.

The load moment $M_L$ can, however, also be compensated 16 for as shown in the embodiment according to FIG. 2. The 17 embodiment of FIG. 2 differs from that of FIG. 1 in that an additional regulator circuit F is provided. Also, the PI regulator $K_R*I$ in the regulator circuit M of the motor shaft in FIG. 1 has been replaced in FIG. 2 by a proportional regulating element $K_R$.

Through a regulating element $T_{EG}$ in the regulator circuit F the entire regulating system is simulated and a theoretical motor speed $N_{MT}$ is simulated. The entire regulating system comprises the regulator circuit M of the motor shaft, the regulator circuit L of the load shaft and the regulator circuit B of the control unit. The theoretical motor speed $N_{MT}$ already takes into consideration the spring moment $M_F$ and the difference speed $N_D$. At adder A8 this theoretical motor speed $N_{MT}$ is compared with the actual motor speed $N_I$. If a regulating deviation results with a difference speed $N''_D$, then a quantity $M'_L$ proportional to the load moment is determined stationarily from the difference speed $N''_D$ via an integrating element $T_I$. This quantity $M'_L$ is supplied to the regulating system M of the motor shaft via the adder A2 for compensation.

What is claimed is:

1. A method for detecting and regulating a spring moment and a difference speed in a rotationally driven system having a motor and a load in a drive unit which acts as an elastically coupled two-mass system, the method comprising the steps of:

simulating in a control unit a spring moment and a difference speed between a first mass and a second mass of said drive unit, with said first mass representing the inert mass of said motor and said second mass representing the inert mass of said load, wherein said simulating steps includes the steps of determining the simulated difference speed from a difference of a simulated motor speed and an actual motor speed, and integrating said simulated difference speed to form said simulated spring moment; and supplying said simulated spring moment and said simulated difference speed as correction values to a system regulator that regulates the rotationally driven system.

2. The method of claim 1, further comprising the steps of setting a nominal motor moment with a PI controller and at least one of said correction values, and compensating for an occurring load moment by an I-component of said PI controller.

3. The method of claim 1, further comprising the steps of setting a nominal motor moment with a proportional element and at least one of said correction values, simulating said driven system in said control unit to generate a theoretical motor speed, comparing said theoretical motor speed and said actual motor speed to produce a derived speed difference, and compensating for an occurring load moment and setting said nominal motor moment by integrating said derived speed difference.

* * * * *